United States Patent [19]

Merrill

[11] Patent Number: 4,641,877

[45] Date of Patent: Feb. 10, 1987

[54] LIFTING CLAMP CAM WEAR INDICATOR AND METHOD

[75] Inventor: George O. Merrill, Forest Hills, N.Y.

[73] Assignee: Cooper Industries, Inc., Houston, Tex.

[21] Appl. No.: 777,392

[22] Filed: Sep. 18, 1985

[51] Int. Cl.[4] ........................ B66C 1/48; G01D 21/00

[52] U.S. Cl. .................................... 294/101; 116/208; 294/902

[58] Field of Search .................... 294/86.4, 101, 103.1, 294/104, 901, 902; 73/162; 116/208; 152/154.2; 269/285

[56] References Cited

U.S. PATENT DOCUMENTS

| | | | |
|---|---|---|---|
| 1,351,530 | 8/1920 | Meals | 294/101 |
| 2,393,101 | 1/1946 | Gardner | 294/104 |
| 2,706,509 | 4/1955 | White | 116/208 X |
| 3,384,145 | 5/1968 | Wolfer | 152/154.2 |
| 3,414,272 | 12/1968 | Rogers | 116/208 X |
| 4,226,274 | 10/1980 | Awaya et al. | 152/154.2 |

FOREIGN PATENT DOCUMENTS

| | | | |
|---|---|---|---|
| 1279966 | 6/1972 | United Kingdom | 116/208 |

*Primary Examiner*—Johnny D. Cherry

*Attorney, Agent, or Firm*—E. E. Scott; A. R. Thiele

[57] ABSTRACT

A plate lifting clamp has an eccentric cam with spaced apart teeth having sharp crest edges which are provided with slots extending radially into the teeth. Excessive wear on the teeth may be visually observed by the decreasing depth of the slot or disappearance thereof on any one tooth. The tooth crests may be curved in a plane parallel to an axis of rotation of the cam so that a generally elliptical shaped surface appears on the tooth crest as it is worn away. The length of the wear surface may be measured to determine when cam replacement is desirable.

8 Claims, 7 Drawing Figures

LIFTING CLAMP CAM WEAR INDICATOR AND METHOD

BACKGROUND OF THE INVENTION

1. Field of the Invention

The present invention pertains to a cam tooth wear indicator and method for lifting clamps used for lifting and conveying metal plate and other structural elements.

2. Background

Lifting clamps for heavy metal plate, various metal structural shapes and other elements such as materials storage drums are subject to relatively rough handling and rapid wear through use. These types of clamps are also typically used in rather harsh environments where abrasive material is often caught between the clamp cam surface and the elements being lifted which contributes to the rapid wear of the clamp cam.

The clamps are typically of a type wherein an eccentric cam is provided with a curved surface having a number of serrations or teeth which engage the element being lifted and are operable to increase their gripping force in direct proportion to the lifting or conveying effort exerted on the element being clamped. Since this type of clamp is typically used in applications wherein relatively unskilled workers are handling the clamp it is preferable that some relatively convenient form of wear indicator be provided for the cam teeth. Moreover, it is also desirable that a relatively convenient method of ascertaining the amount of tooth wear be available to the clamp operator so that the cams can be replaced when tooth wear approaches a point which would diminish the cam tooth penetration of the element being lifted and to some extent the lifting capability of the clamp.

One problem with lifting clamps of the type to which the present invention pertains relates to the relative difficulty with which the clamp cam can be visually inspected or measured. Typically, the type of clamp with which the present invention is used includes a somewhat inverted "u" shaped jaw on which an eccentric cam is supported for pivotal movement and connected to suitable linkage for urging the cam into gripping engagement with the plate or structural member to be lifted by the clamp. The clamp cam is usually disposed in the recess formed by the jaw and is not easily accessible for inspection or measurement. Accordingly, a convenient visual inspection method and means is highly desirable to indicate the condition of the cam teeth during use of the clamp and without requiring that the clamp be disassembled or removed from its normal work site.

SUMMARY OF THE INVENTION

The present invention provides an improved material handling apparatus, specifically a plate or structural element lifting clamp having an eccentric toothed gripping cam which is provided with improved means for visually detecting cam tooth wear. The present invention also provides a unique method of determining cam tooth wear for a material handling lifting clamp or the like.

In accordance with one aspect of the present invention there is provided a material lifting clamp having an eccentric cam with a plurality of spaced apart gripping teeth for engagement with a metal plate or other structural elements for use in lifting and handling such material and wherein the teeth are each provided with a generally centrally located slot extending normal to the tooth crown. The slots are of a prescribed depth so that as a tooth wears down toward its root or base the depth of the slot will diminish and the slot in fact will disappear when wear is sufficient to recommend replacement of the cam. In accordance with another aspect of the present invention there is provided a material lifting clamp having an improved cam tooth configuration which will develop a predetermined wear pattern, which wear pattern may be conveniently measured to determine when the cam teeth have worn to a degree recommending cam replacement.

The present invention still further provides an improved material handling or lifting clamp generally of the type having a pivoting cam which is self-gripping as lifting forces are applied to the clamp and the material gripped thereby. Those skilled in the art will recognize the above noted features and advantages of the present invention as well as other superior aspects thereof upon reading the detailed description which follows in conjunction with the drawing.

DESCRIPTION OF THE PREFERRED EMBODIMENTS

Figure 1:
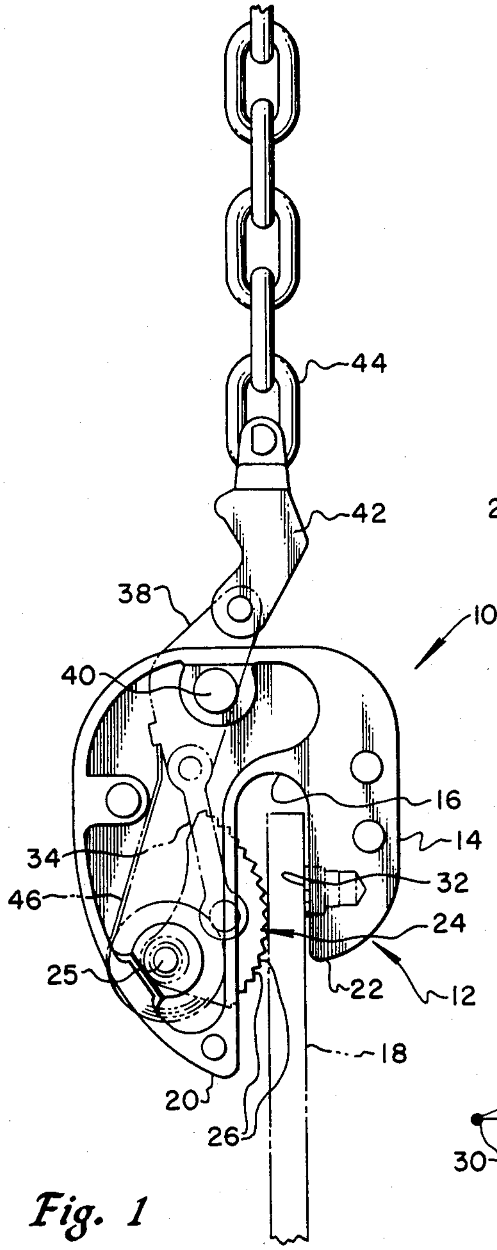
FIG. 1 is a side elevation of an improved material handling or lifting clamp for metal plate and other structural shapes in accordance with the present invention.

In the description which follows like parts are maked throughout the specification and drawing with the same reference numerals, respectively. The drawing figures are not necessarily to scale and certain features of the invention may be shown exaggerated in scale in the interest of clarity.

Referring to FIG. 1, there is illustrated a material handling device in the form of a metal plate or other structural member lifting clamp, generally designated by the numeral 10. The lifting clamp 10 is of a type which is typically used in metal plate fabricating and warehousing installations for lifting steel, aluminum and other types of metal plate of relatively heavy weights, for example, from 0.50 tons up to approximately 7.0 tons or more. The lifting clamp 10 is characterized by a generally inverted "u" shaped housing 12 formed by a pair of spaced apart jaw members 14, one shown, which are aligned with each other and form a somewhat inverted "u" shaped opening 16 for receiving a metal plate 18 or other portion of a structural member. The lifting clamp 10 may be of a type known as a series "G" lifting clamp made and sold under the trademark Merrill by the Campbell Chain Division, Cooper Industries, Inc., York, Pa. The lifting clamp 10 may be used singly or in pairs and suspended from a lifting sling for lifting the metal plate 18 or other structural members. The clamp 10 is typically used in a relatively harsh working environment wherein repeated use of the clamp causes relatively rapid wear of the working parts and in particular the plate gripping cam which will be described in further detail herein.

Preferably, the housing 12 is constructed such that the jaws 14 have opposed depending leg portions 20 and 22 wherein the leg portion 20 is of a greater length or extent as compared with the leg portion 22. The lifting clamp 10 is of a type having a movable cam, generally designated by the numeral 24, which is mounted between the jaw members 14 and is pivotable about a pivot pin 25 between working and nonworking positions. The cam 24 is of a configuration, see FIG. 2 also, which approximates a circular sector and is provided with a plurality of spaced apart parallel teeth 26 having, respectively, transversely extending sharp crests 28. A pivot pin bore 27 is provided for receiving the pin 25 and which is eccentric with respect to the radius center of an arcuate rim formed by the teeth 26. The teeth 26 are arranged relative to a pivot axis 30 of the cam 24 such that successive ones of the teeth make a preferred gripping angle in engagement with a metal plate over a range of plate widths which are predetermined by selection of the width of the opening 16 and hence the grip range size of the clamp 10.

The cam 24 is somewhat-self energizing in gripping the plate 18 between a serrated pad 32, FIG. 1, and the cam teeth 26. A connecting link 34, FIG. 1, is pivotally connected to the cam 24 at a pivot bore 36, see FIG. 2, spaced from the pivot axis 30. The link 34 is connected to a radius link 38 which is also mounted on the housing 12 between the jaws 14 for pivotal movement about a pivot 40. The link 38 is further pivotally connected to a lifting member 42 which, in turn, is connected to a lifting chain 44 or other lifting means, not shown. The links 34, 38 and the member 42 are operable to effect movement of the cam 24 into a plate gripping position and wherein, in response to exerting a lifting force on the member 42, the cam 24 is biased into ever tighter gripping engagement with the plate 18 as a lifting force is exerted on the clamp 10 to lift the plate. The lifting clamp 10 may also be provided with a torsion coil spring, generally designated by the numeral 46, which is disposed around a hub portion of the cam 24 and is operable to bias the cam into the plate gripping position, at all times. Those skilled in the art will appreciate that the position of the cam 24, as urged by the spring 46, to close over the opening 16 further aggravtes the relatively rapid wear which is experienced on the gripping teeth 26 whereby, in any usage of the clamp 10, the cam is engaged by the plate or other member to be gripped by the clamp as the member is inserted into the opening 16. This type of action can result in high impact as well as rapid wear type forces being exerted or imparted to the cam 24 during normal use.

Figure 3:
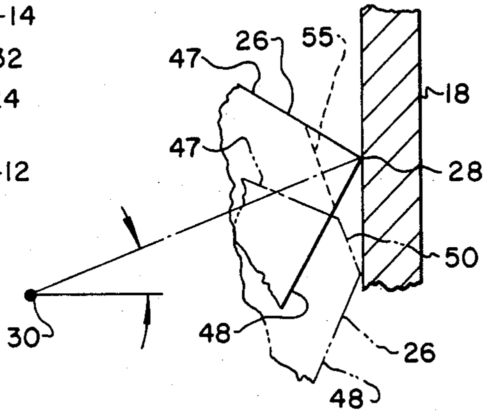
FIG. 3 is a detail view showing the preferred position of a tooth when gripping or clamping a metal plate in the unworn position versus a somewhat worn condition of the tooth crest.

The geometry of the spaced apart teeth 26 as regards the pivot axis 30 is of some importance to achieving a suitable gripping engagement of a plate such as the plate 18. As illustrated in FIG. 3, preferably, each of the teeth 26 is adapted to have opposed planar flanks 47 and 48 which intersect each other to form the crest 28. The crest 28, forming a somewhat sharp edge and typically being of heat treated and hardened steel, forcibly engages and penetrates the surface of the plate 18 during gripping thereof. The crest 28 is, however, subject to rapid wear, depending on the operating environment and care with which the clamp 10 is utilized, and forms a somewhat flattened surface 50 after a certain amount of wear takes place. The formation of the flattened surface 50 may actually be somewhat more irregular than illustrated in FIG. 3 and the intersections of the flanks 47 and 48 with the surface 50 may be somewhat rounded in shape as opposed to the relatively sharp edges illustrated in the drawing figure. In any case, as the sharp crest edge 28 wears away a relatively flat surface such as the surface 50 is formed.

Figure 2:
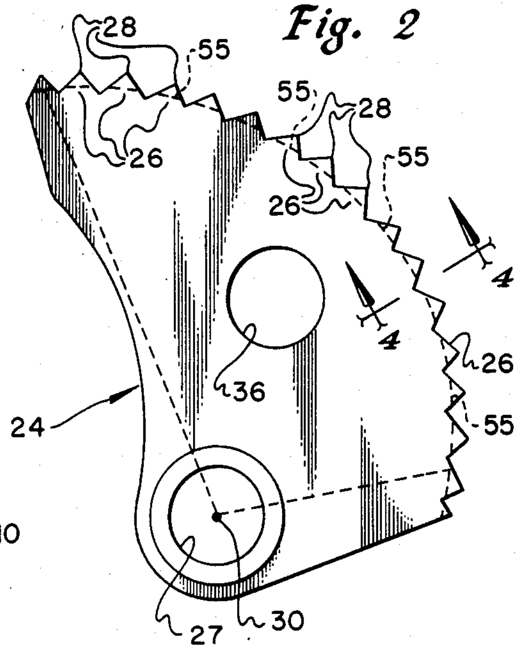
FIG. 2 is a detail side elevation of an improved cam for the lifting clamp of the present invention.
Figure 4:
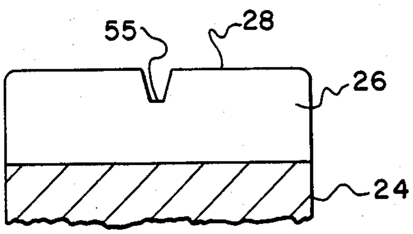
FIG. 4 is a detail section view taken along the Line 4—4 of FIG. 2.

In this regard it is desirable to avoid the detriments of excessive wear of the cam gripping teeth 26 by preferably providing each of the teeth with a wear indicator slot 55, as illustrated in FIGS. 2, 3 and 4. The slot 55 is preferably placed about midway along the crest 28 between opposite lateral sides of the teeth 26 and extends normal to the crest into a tooth 26 to a depth which is predetermined to correspond to the maximum allowable wear of a tooth before the cam 24 should be replaced. The slots 55 are easily viewable when the cam 24 is in use or when the clamp 10 has released its engagement with a plate or other structural member since, as indicated by a working position of the cam 24 in FIG. 1, a substantial number of working teeth may be easily viewed as the cam pivots into a nonworking position when a plate or other member is removed from the opening 16. Accordingly, visual inspection is easily obtained even if only one tooth 26 is excessively worn due to repeated use of the clamp 10 with plates of eaual width. If, upon even casual visual inspection, it is observed that one or more of the slots 55 have "disappeared" from one or more of the teeth 26 it is indicated that the cam 24 should be replaced in order to minimize the chance of malfunction of the clamp 10.

Figure 5:
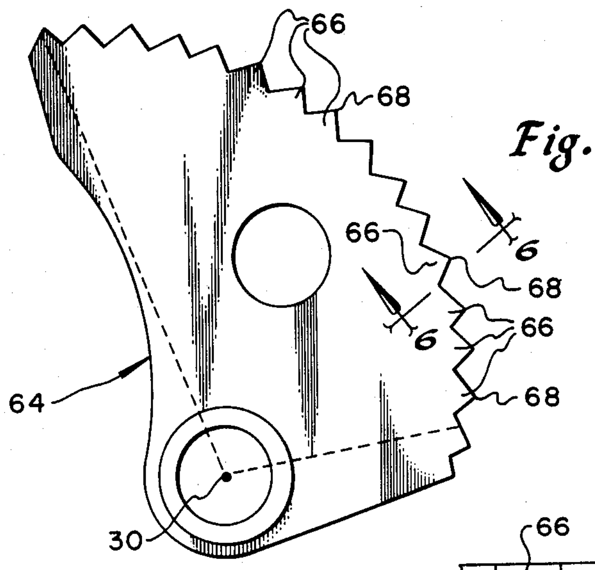
FIG. 5 is a detail side elevation of a cam in accordance with an alternate embodiment of the present invention.
Figure 7:
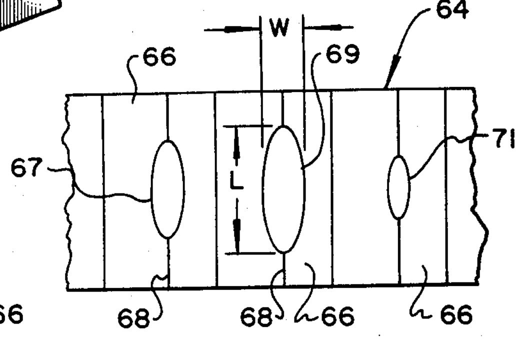
FIG. 7 is a developed plan view of some of the teeth of the cam illustrated in FIGS. 5 and 6 showing a measurable wear pattern developing on certain teeth.
Figure 6:
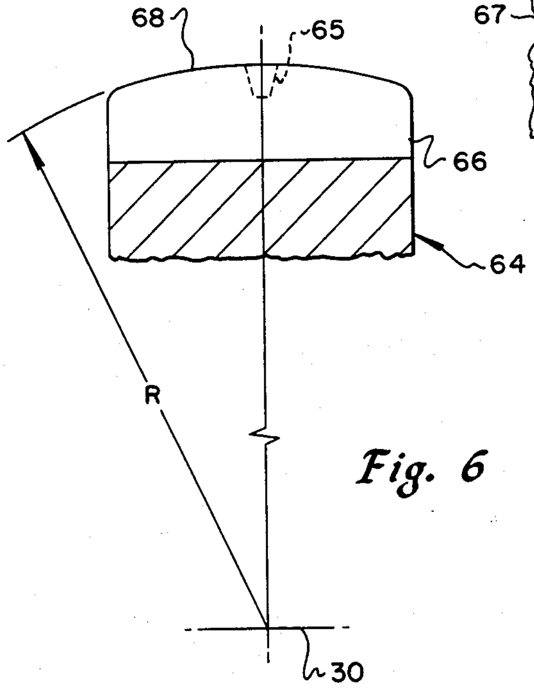
FIG. 6 is a detail section view taken along the line 6—6 of FIG. 5.

Referring now to FIGS. 5, 6 and 7 an alternate embodiment of the present invention is provided in the form of a cam 64 similar to the cam 24 and provided with a plurality of spaced apart wedge shaped teeth 66 having sharp edged crest portions 68. The cam 64 is adapted to be mounted in a housing 12 and otherwise provide a plate clamp virtually identical to the plate clamp 10. Each of the working teeth 66 of the cam 64 has a somewhat arcuate or otherwise crowned crest 68 of radius R, as indicated in FIG. 6, when viewed in a plane parallel to the pivot axis 30. Although the teeth 66 may be provided with a wear indicator groove or slot, 65, similar to the slots 55 provided for the flat surfaced teeth 26, the cam 64 is preferably provided without the wear indicator slots.

Thanks to the curvature of the crests 68, as illustrated in FIG. 6, progressive wear on the teeth 66 will generate somewhat oval or elliptical shaped surfaces, as illustrated in FIG. 7, and designated by the numerals 67, 69 and 71 for respective adjacent ones of the teeth 66. When the extent of one of the somewhat oval wear surfaces 67, 69 and 71 reach a predetermined length "L" and/or width "W", FIG. 7, it is indicated that the cam 64 should be replaced in order to minimize problems with proper functioning of a plate clamp utilizing a cam 64 in place of a cam 24, for example. Again, due to the relatively easy manner in which the cams 24 or 64 may be viewed, particularly when they are placed in a nonworking position when the clamp is empty, the amount of wear incurred by one or more of the teeth 64 may be conveniently measured by a machinist's scale or other suitable measuring device provided for the purpose of determining the length or width of the surfaces 67, 69 and 71. Accordingly, if any of the teeth 66 have the relatively large wear surface 69 compared with predetermined limit values for such measurements, it is indicated that the cam 64 should be replaced by a new cam. The provision of a curved crest edge 68 for each of the working teeth 66 provides for the unique configuration and easily recognizable shape of the wear surface which will alert the user of the plate clamp utilizing the cam 64 that the cam should be replaced.

Accordingly, in regard to the second embodiment of the present invention there is contemplated a method for determining the amount of wear on the plate gripping cam of a material handling lifting clamp wherein the cam is provided with a plurality of spaced apart gripping teeth which are arranged on an arcuate rim or surface, which teeth include a somewhat curved crest edge as viewed in a plane generally parallel to the axis of rotation of the cam. If, upon being subjected to wear from repeated use of the cam 64, a generally flat somewhat oblong or elliptical shaped surface develops, the length and/or width of the surface is measured. At a predetermined length or width, indicating a predetermined amount of wear, the cam is replaced.

Although preferred embodiments of the present invention have been described herein those skilled in the art will recognize that various substitutions and modifications may be made to the specific tooth configuration and method of determining excessive wear in a material handling and lifting clamp of the type described without departing from the scope and spirit of the invention as recited in the appended claims.

What I claim is:

1. In a lifting clamp for lifting metal plate or the like, a clamp housing including means forming a "u" shaped recess for receiving a portion of the metal plate or the like, a plate gripping cam pivotally mounted on said clamp housing for movement into gripping engagement with the metal plate or the like for securing the metal plate or the like to said clamp housing between said plate gripping cam and one side of said "u" shaped recess, said plate gripping cam including a plurality of spaced apart plate gripping teeth arranged along an arcuate rim with respect to an axis of rotation of said plate gripping cam, said spaced apart plate gripping teeth including a crested edge extending generally in a plane parallel to said axis of rotation of said plate gripping cam and at least one of said crested spaced apart plate gripping teeth having a slot in said crested edge which may be viewed from the exterior of the lifting clamp when a plate member is not disposed in said "u" shaped recess, said slot providing a means for indicating wear, whereby when said tooth having a crested edge in a slot is used to a degree such that said crested edge is worn away, the depth of said slot in said crested edge tooth will be reduced or will disappear thereby indicating to the observer the degree of wear on said crested edge tooth.

2. The lifting clamp as defined in claim 1, wherein:
said slot in said crested edge is located approximately midway between opposite lateral sides of said crested edge spaced apart plate gripping teeth.

3. The lifting clamp as defined in claim 1 wherein:
said crested teeth have a rounded crown crest edge generally in a plane parallel to said axis of rotation of said cam.

4. In a lifting clamp for lifting a metal plate or the like, a clamp housing including means forming a "u" shaped recess for receiving a portion of the metal plate or the like, a plate gripping cam pivotally mounted on said clamp housing for movement into gripping engagement with the metal plate or the like for securing the metal plate or the like to one side of said "u" shaped recess in said clamp housing, said plate gripping cam including a plurality of spaced apart plate gripping teeth arranged along an arcuate rim with respect to an axis of rotation of said plate gripping cam, at least one of said plate gripping teeth having a crest extending generally in a plane parallel to said axis of rotation of said plate gripping cam, each of said crested plate griping teeth having a slot in said crest located approximately midway between opposite lateral sides of said plate gripping cam which slot may be viewed from the exterior of said lifting clamp, whereby said slot will provide means for indicating wear when said crested tooth is worn to a degree such that said crest is diminished said slot in said crested tooth will disappear thereby indicating excessive wear on said crested tooth.

5. A method for determining excessive wear on a cam for a lifting clamp comprising the steps of:
providing a plate lifting clamp including a clamp housing including means forming a recess for receiving a portion of a metal plate member or the like, a plate gripping cam pivotally mounted on said housing for movement into gripping engagement with said plate member for securing said plate member to said housing, said cam including a plurality of spaced apart plate gripping teeth arranged along a rim with respect to an axis of rotation of said cam, at least selected ones of said teeth including a crest edge extending generally in a plane parallel to said axis of rotation and having a curvature when viewed in said plane whereby as said teeth wear away toward said axis a generally planar oval surface develops;
inspecting said teeth from time to time to determine the existence of said oval surface; and
measuring said oval surface to determine the extent of wear on said teeth, respectively.

6. The method set forth in claim 5, including the step of:
measuring the length of said oval surface parallel to said crest edge.

7. The method set forth in claim 5, including the step of:
measuring the maximum length and width of said oval surface and comparing said measurements with predetermined limit measurements to determine the extent of wear on said teeth.

8. A wear indicating system for a device for lifting a metal plate or the like comprising:
a lifting clamp, said lifting clamp including a housing forming a U-shaped recess for receiving a portion of the metal plate or the like;
a plate gripping cam pivotally mounted on said housing for movement into gripping engagement with the plate member or the like for securing the plate member or the like to said housing, said plate gripping cam including an arcuate rim with respect to an axis of rotation of said plate gripping cam;

a plurality of spaced apart plate gripping teeth arranged along said arcuate rim;

at least one of said spaced apart plate gripping teeth including a curved crest constructed and arranged to form a substantially oval surface as said tooth wears whose area is indicative of the wear of said tooth; and means integral with said curved crest spaced apart plate gripping teeth to determine the size of said substantially oval surface.

* * * * *